(12) United States Patent
Bagley et al.

(10) Patent No.: US 7,337,621 B2
(45) Date of Patent: Mar. 4, 2008

(54) OPTICAL FROST SENSOR

(75) Inventors: Alan Bagley, Gilroy, CA (US); Jeffrey Bagley, San Jose, CA (US)

(73) Assignee: BBC Enterprises, Inc., Carson City, NV (US)

( * ) Notice: Subject to any disclaimer, the term of this patent is extended or adjusted under 35 U.S.C. 154(b) by 0 days.

(21) Appl. No.: 11/033,249

(22) Filed: Jan. 7, 2005

(65) Prior Publication Data

US 2005/0189493 A1    Sep. 1, 2005

Related U.S. Application Data

(60) Provisional application No. 60/580,744, filed on Jun. 18, 2004, provisional application No. 60/546,420, filed on Feb. 19, 2004, provisional application No. 60/534,940, filed on Jan. 7, 2004.

(51) Int. Cl.
*F25D 21/02* (2006.01)
*G08B 19/02* (2006.01)

(52) U.S. Cl. .................... 62/140; 62/128; 340/583

(58) Field of Classification Search ............... 62/140, 62/151, 156, 128; 340/583; 165/133; 250/341.1, 250/574, 341.8, 338.5
See application file for complete search history.

(56) References Cited

U.S. PATENT DOCUMENTS

| | | | | | |
|---|---|---|---|---|---|
| 3,377,817 | A | * | 4/1968 | Petranek | 62/140 |
| 3,961,495 | A | * | 6/1976 | Beauvent et al. | 250/341.1 |
| 4,045,971 | A | * | 9/1977 | Brenner, Jr. | 62/140 |
| 4,232,528 | A | * | 11/1980 | Behr | 340/583 |
| 4,450,691 | A | * | 5/1984 | Taylor | 62/140 |
| 4,593,533 | A | * | 6/1986 | Alsenz | 340/583 |
| 5,514,248 | A | * | 5/1996 | Okuda et al. | 165/133 |

\* cited by examiner

*Primary Examiner*—Chen Wen Jiang
(74) *Attorney, Agent, or Firm*—GSS Law Group; Gregory Scott Smith

(57) ABSTRACT

The present invention relates to a device and method for operating a fully automatic, "on demand" refrigeration defrost cycle and controlling the frost build-up on the evaporative surfaces of both medium temperature (above freezing), and low temperature (below freezing) refrigeration devices or on any system or device requiring control by optical contrast.

20 Claims, 5 Drawing Sheets

OPTICAL FROST SENSOR

CROSS REFERENCE TO RELATED APPLICATIONS

The present invention claims the priority of the following provisional patent applications, Ser. No. 60/534,940 filed Jan. 7, 2004 entitled "Device and Method for Operating a Refrigeration Deicing Cycle", Ser. No. 60/546,420 filed Feb. 19, 2004 entitled "Optical/Thermal Clip and Sensor", Ser. No. 60/580,744 filed Jun. 18, 2004 entitled Optical/Thermal Mounting Clip and Sensor, each of which is hereby incorporated by reference in their entirety. Patent application Ser. No. 10/603,578 entitled Device and Method for Operating a Refrigeration Cycle Without Evaporator Icing" is also hereby incorporated by reference in its entirety.

FIELD OF THE INVENTION

The present invention relates to a device and method for controlling frost formation on the evaporator of a device operating in a refrigeration cycle. More particularly, the invention includes a method of operating any system where changes in light absorption can be used to detect frost formation.

BACKGROUND OF THE INVENTION

The refrigeration cycle has numerous uses including refrigeration and freezing, air conditioning, and removing water from moist air to dehumidify air or to produce water.

During operation refrigeration evaporator coils of a refrigeration system tend to collect frost. As the frost grows, the airflow through the evaporator is reduced which reduces the effectiveness and efficiency of the refrigeration. For example, when evaporators on refrigerator storage systems freeze the interior air temperature of the system rises, possibly degrading or spoiling the product within. As the evaporator continues to collect water vapor the frost becomes hard ice, which can take hours to defrost. Such systems must be deiced, either manually or automatically, preferably before sufficient frost or ice has formed to cause a reduction in performance.

Present systems are generally defrosted by means of timers which turn the system off and/or use electrical heaters or hot gas to defrost the evaporator coils. Typical refrigeration systems have no means to "know" if they need to be defrosted or if defrosting is complete. Furthermore, many of the defrost systems currently available require a significant amount of power to complete, and the commercial refrigeration industry is responsible for the consumption of a large part of the world's power budget.

What is needed is a means to allow refrigeration or freezer systems to operate at any ambient air temperature, limit frost build up, while providing an effective, reliable means to defrost them without degrading the product within. The system described herein will accomplish these requirements.

SUMMARY OF INVENTION

The present invention relates to a device and method for controlling frost formation on the evaporator of a device operating in a refrigeration cycle by initiating defrost cycles when frost is optically detected. In preferred embodiments the invention uses changes in the absorption electromagnetic radiation energy wavelengths to detect frost formation. When frost is detected, a signal is sent to a controller which activates a defrost cycle. The invention may be used in virtually any refrigeration system using virtually any defrost method, including but not limited to hot or medium gas bypass, ambient air defrost, and electric element defrost.

Another aspect of the invention includes an optical/thermal device that can be installed on an evaporator coil of a refrigeration system. In this embodiment the device includes both an optical means for detecting frost, and a thermal or temperature sensing device. In one embodiment the optical/thermal device described herein is used to initiate and/or end refrigeration defrost cycles on demand, which means the defrost cycle is initiated only as required or desired. The sensor signals the defrost cycle to begin, however, any means may be used to signal the end of the defrost cycle. In the preferred embodiment, the defrost cycle end is signaled by the temperature sensing element of the optical/thermal device. In alternate embodiments the defrost termination sensor may be located elsewhere in the refrigeration system.

The present invention may be used for other applications as well where detection of changes in light absorption is a requirement. The invention also includes a device intended to easily retrofit a variety of refrigeration units. In other embodiments, the optical/thermal sensor may be used in conjunction with other sensors or timers to control the defrost cycle.

In one embodiment, the housing which houses the optical sensor, includes a prefocused optical target. This target is preferably configured approximate the frosting condition on the leading edges of frost collecting evaporator surfaces.

Advantages of the invention may include allowing refrigeration or freezer systems to operate at any ambient air temperature, limit frost build up while providing an effective reliable means to defrost them without degrading the product within. In some embodiments features of the invention may further include: (1) Operational range: −40 F to +40 F and return in 10 minutes. (2) Monitoring frost and ice growth in real time. (3) The ability to defrost itself and shed water droplets that may otherwise affect operation. The target may be positioned and shaped to allow frost or ice growth, but be protected by shape or external means from retaining condensed water droplets. (4) easy installation on any evaporator without bolts, nuts or screws. (5) Fast "on demand" de-ice or defrost cycle (because excess frost is inhibited from building). (6) Reduced ambient air temperature rise (further protecting the refrigerated or frozen product).

In some embodiments, the frost controlling device has the ability to defrost itself by means of thermal dynamics. Specifically, the device has the ability to harvest heat generated by the defrost cycle. For example, as the evaporator fins warm during defrosting, heat is transferred to the optical/thermal device. In optical/thermal embodiments of the invention the defrosting signal may be activated when the thermal element detects that the device has reached a preset temperature.

In some embodiments portions of the device are fabricated form, materials having good thermal transfer properties. In some embodiments the device may be fabricated from materials including but not limited to copper or beryllium copper, or other materials such as plastics. In some applications the frost detecting device of the invention is designed to fit at a selected location on a single evaporator coil.

In one embodiment the optical/thermal device is designed to enclose optics operating in any selected wavelength or spectrum (including but not limited to infrared and visible light spectrums) and transmit its signal over conventional wire, wireless transmission, or fiber optic cable, preferably via interface electronics, to a standard refrigeration controller.

The optical/thermal device can be used in virtually any known refrigeration system. As previously mentioned, the optical/thermal device is preferably designed to allow frost to grow on the frost detection target at a rate similar to the rate on which frost is forming on the evaporator coils. The ability to adjust the frost set point may be added as an option.

In preferred embodiments, the optics are capable of detecting changes in energy absorption on the target to detect frost formation. Supporting electronics control the contrast set point. When the contrast point is achieved, a signal, compatible with most industry refrigeration controllers is sent by the optical electronics to a refrigeration controller, which will initiate a defrosting cycle in any refrigeration system or any system where operational change may be controlled using the device of the invention. This device has the ability to initiate defrosting on demand with most existing refrigeration controllers which have their own ability to end defrost, by time or temperature. Virtually any known controller may be useable in the invention.

The invention includes a device that permits the operation of a refrigeration cycle while at temperatures above freezing 32 degrees F. avoiding evaporator icing, or below 32 degrees F., in systems intended to generate frost formation, including but not limited to air conditioners, dehumidifiers, water makers, and both commercial and consumer refrigerators and freezers.

DETAILED DESCRIPTION OF THE INVENTION

BRIEF DESCRIPTION OF THE FIGURES

Figures are provided solely to aid the reader in understanding the invention. They are not intended and are not to be construed as limiting the scope of this invention in any manner whatsoever.

DEFINITIONS

Figure 1:
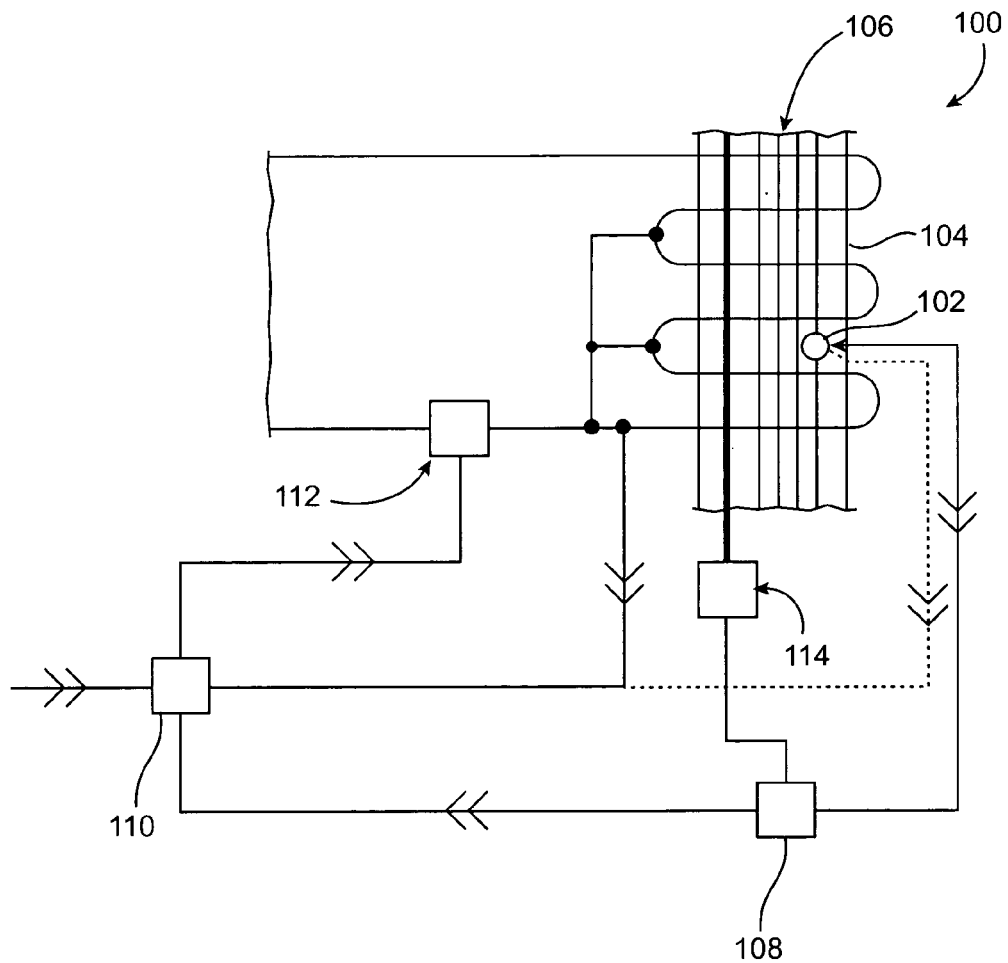
FIG. 1 show a representative or example refrigeration system including a frost detection device built in accord with the invention.

As used herein, frost shall mean the growth of ice crystals generated by collecting water molecules on any material whose temperature is below 32 degrees F. Ice shall mean any frost crystals which have melted and allowed to re-refreeze. Ice is generally, but not always, clear.

A timer as used herein shall mean any known apparatus or method for timing events including but not limited to a timing circuit integral with the controller, such as timing circuit in a microprocessor used as the controller.

As used herein, a "refrigeration system" refers to apparatus using the of well-known thermodynamic cycle of gas compression to a hot, high pressure gas, condensation of the hot, high pressure gas to a warm, high pressure gas with concomitant release of heat energy to the external surroundings, metering of the warm, high pressure gas through a device permitting expansion of the liquid to afford a cool, low pressure liquid, evaporation of the cool, low pressure liquid to a cool, low pressure gas with concomitant absorption of heat energy from the external surroundings and re-compression of the cool, low pressure gas to begin the cycle again. In one sense, the refrigeration cycle is considered to be a cooling means. However, if air in contact with the outside of the evaporator contains water vapor and the temperature of the cool liquid in the evaporator is below the dew point of the air, then water will condense on the outside of the evaporator resulting in its removal from the air. Thus, the refrigeration cycle may be considered a water-removal means as well as a cooling means. With regard to the terms "hot," "warm" and "cool," when referring to the refrigerant liquid/gas used in the device herein, it is to be recognized that these terms are being used strictly in their comparative sense, that is, "hot" is a higher temperature than "warm," which is a higher temperature than "cool." It is unnecessary to the understanding or operation of the device and method of this invention to speak in terms of absolute temperatures or temperature ranges, except where expressly set forth, because these will depend on ambient air temperature, the refrigerant used, the degree of pressurization of the refrigerant in the compressor, the amount of heat that must be removed from the hot, high pressure gas in the condenser to obtain a liquid, etc. and each of these is readily determinable by those skilled in the art using standard thermodynamic principles. The term refrigeration system comprehends the use of the system to include any known purpose including but not limited to refrigerating, freezing, dehumidifying, and water condensing.

As used herein, a "thermal sensor" or a "temperature sensor" refers to a device that is capable of measuring temperature at a specific location and includes, without limitation, a thermometer, a thermocouple, a thermistor and the like.

As used herein, a "controller" refers to a device that is capable of causing an event based on a received signal. For example, a controller upon receiving the appropriate signal from one or more of a timer, a temperature sensing means, or an ice detecting means, is capable of causing the hot gas bypass to open or close and thereby permit or prohibit the mixing of hot gas and cool liquid initiating any system required event. A controller may comprise mechanical, electrical or optical components of combinations thereof. In a presently preferred embodiment of this invention, a controller comprises a microprocessor. In some embodiments, the controller may incorporate the signal source. For example the controller could be a microprocessor with a integral timers. The controller may also initiate defrosts using electric heaters.

As used herein, "ambient air temperature" is meant the temperature of atmospheric air external to or in the environs wherein the evaporator system is located.

Discussion

The present invention relates to a device and method for controlling frost formation on the evaporator of a device operating in a refrigeration cycle by initiating defrost cycles when frost is optically detected. In preferred embodiments the invention uses changes in the absorption electromagnetic radiation energy wavelengths to detect frost formation. The terms "defrosting" or "deicing" are used in this application to mean the removal of crystallized water form the evaporator coils or possibly also other parts of the refrigeration system.

FIG. 1 shows an example refrigeration system in which an optical frost sensing device built in accord with the invention may be used. However, optical frost sensing devices built in accord with the invention can be configured for use in virtually any kind of refrigeration system using virtually any known means for defrosting the evaporator coils. The optical device can be used by itself or in association with other known devices for initiating or halting defrosting cycles.

FIG. 1 shows a typical refrigeration system 100 except that the refrigeration system 100 shown includes both hot gas by pass 112 and electrical heating element 114 for defrosting. Normally a refrigeration system will only include one or the other, and both are shown here merely to indicate that the devices of the invention may be used with many kinds of defrost systems, and not that both hot gas bypass 112 or electrical heaters 114 or any other particular system is required. In the preferred embodiment described, the optical frost sensor 102 will preferably mount to a single fin 104 of a refrigeration evaporator 106. As frost begins to form on the fins and optical target (visible in later figures) on the optical frost sensor 102, an optional optical interface unit 108 detects a change in energy absorption at the target. When a predetermined set point is reached the optical interface unit 108 unit will send a compatible signal to the refrigeration controller 110 to initiate a defrost cycle, which in the example could be either hot gas by pass or electric defrost. The controller will typically handle all other defrost control functions. In preferred embodiments defrost is terminated by temperature, but may also be ended optically or by timer.

Figure 2:
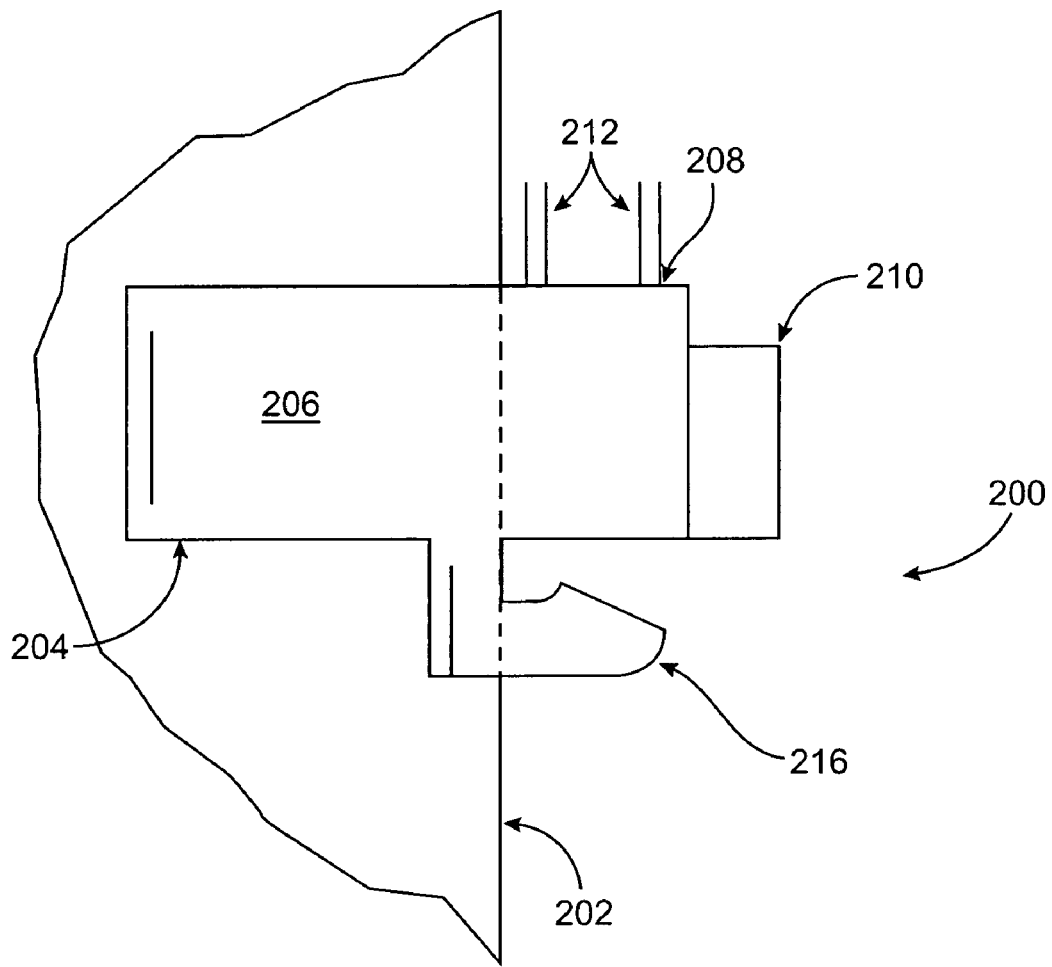
FIG. 2 show a frost detector embodiment built in accord with the invention.

FIG. 2 shows an example embodiment of the optical frost sensor 200. The embodiment discussed includes an optional thermal element (identified below). However, in alternate embodiments there may be no thermal element, or the thermal element may be located elsewhere in the refrigeration system.

Referring still to FIG. 2, a optical frost sensor 200 is shown attached to a fin 202 of an evaporator. In this embodiment, the optical frost sensor 200 has a body 204 that includes a body clip portion 206, an optical housing 208 and a thermal housing 210. Communication lines 212 are coupled to a controller (seen in FIG. 1).

The optical frost sensor 200 is preferably configured to attach to one or a few fins 202 on an evaporator. However, in alternate embodiments, virtually any acceptable means for attaching the optical frost sensor 200 to the evaporator may be used including but not limited to soldering, adhesives (preferably thermally conductive adhesives), and other known means for coupling parts to an evaporator.

The body 206 is preferably fabricated from a single piece of thermally conductive material, but may be formed form separate pieces joined together. Acceptable materials for making the body 204 include but are not limited to copper, copper beryllium alloys, and various plastics. The body 204 may include a coating selected to enhance the shedding or condensed water form the surface of the body 204.

In the embodiment shown the optical housing 208 for housing the optical sensor and the thermal housing 210 for housing the temperature sensor are cylindrical, but could be any shape desired in alternate embodiments.

Optical sensors are well known and typically include a light emitting source such as a light emitting diode, and an energy receiving apparatus such as a photo transistor. Many kinds of acceptable optical sensors are available commercially. The temperature sensor may be any kind of temperature sensor available on the market compatible with typical refrigeration controllers. In the embodiment shown in FIG. 2, the temperature sensor is a thermister.

The optical sensor is preferably pre focused on the target 216. The target 216 is preferably configured to approximate the frost generating conditions experienced by the evaporator. Optional optical support electronics may be included in the optical sensor to provide an electrical optical interface for communication with the controller. In other embodiments the electrical optical interface may be in the controller, or the controller may receive signals directly from the optical sensor.

In some alternate embodiments, rather than detecting changes in light absorption caused by frost formation, it is possible that an optical sensor could be configured to detect minute changes in the distance between the optical device and the target as frost begins to build up. Other ways to use optics or "seeing" electronics will become apparent to those skilled in the art based on the disclosures herein; all such approaches are within the scope of this invention.

Figure 3:
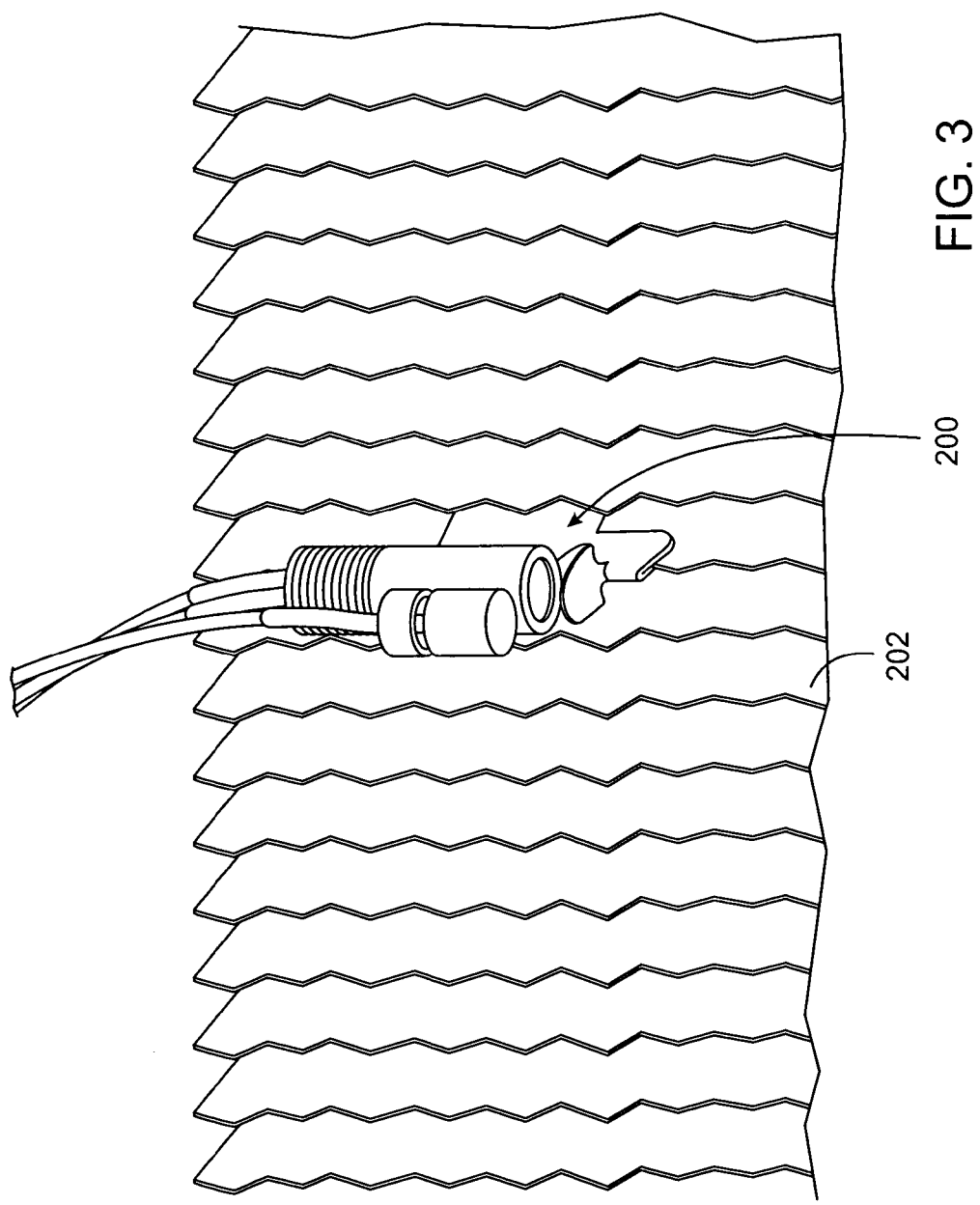
FIG. 3 shows the frost detector embodiment of FIG. 2 installed on an evaporator coil.

FIG. 3 shows a perspective view of the frost detector 200 of FIG. 2 attached to a fin 202 of an evaporator.

Figure 4:
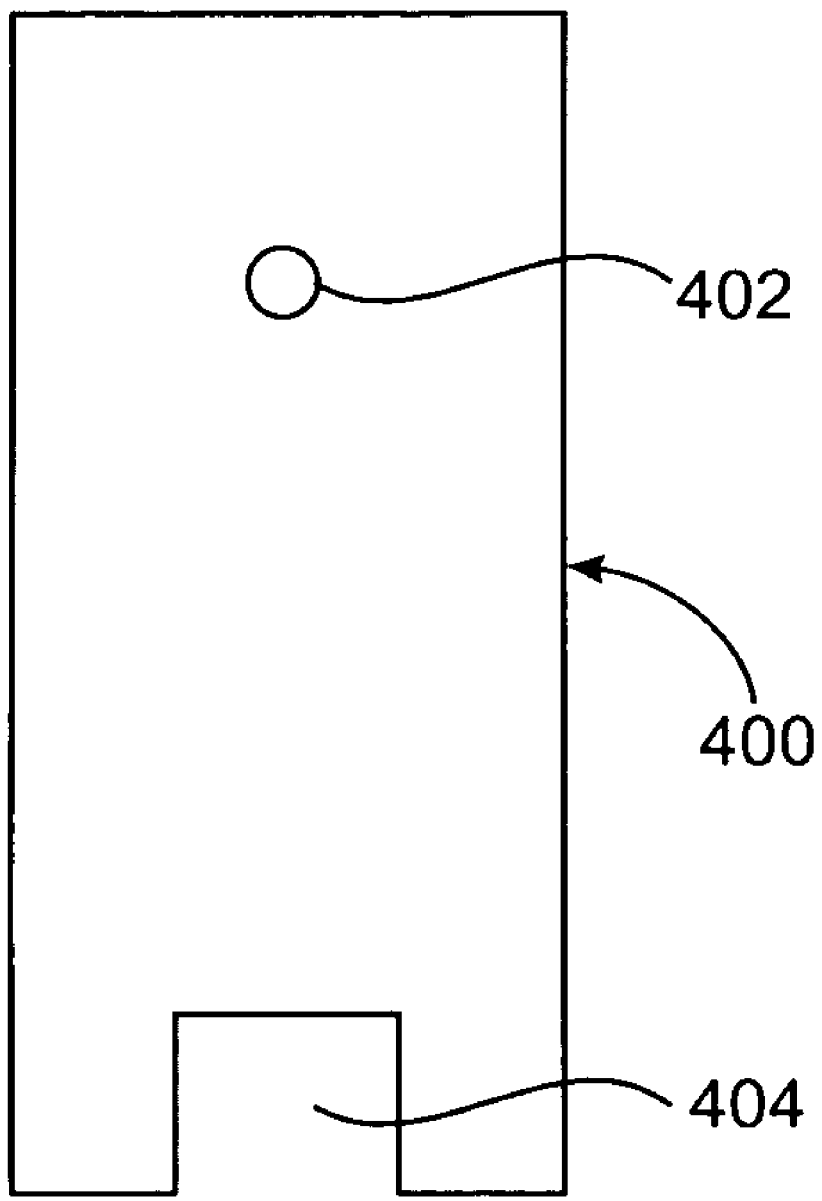
FIG. 4 shows an example drip tube.

In some embodiments, It may be desirable to prepare a drip tube or sleeve 400 to cover the body 204 of the frost detector. FIG. 4 shows an example sleeve 400. In this embodiment the sleeve 400 is preferably fabricated from a material that is hydrophobic, which may prevent significant frost formation on portions of the frost detector 200 and may enhance the shedding or condensed water droplets. The target 216 is protected by the sleeve 400, from condensate, but not from "seeing" ingested air and therefore will experience frost formation. In the embodiment shown, the sleeve 400 includes a dimple 402 which interacts with a feature on the body of the optical frost sensor to hold the sleeve 400 in position. The sleeve 400 may also include an air flow slot 404 intended to allow the target 216 to experience air flow approximating the air flow experienced by the evaporator fins, while preventing a condensate or water droplet to interfere with the system operation.

Figure 5:
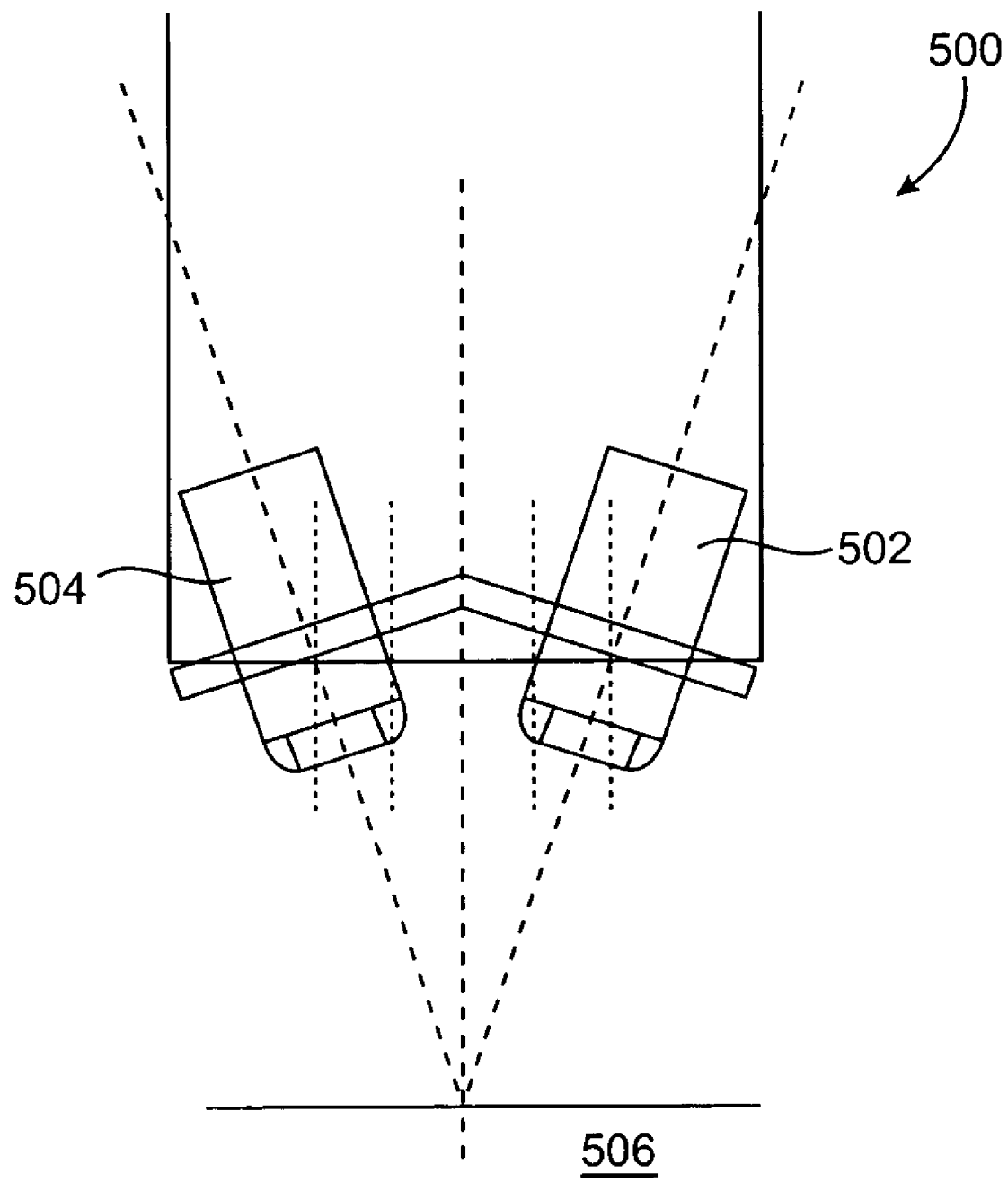
FIG. 5 shows an example optical sensor.

FIG. 5 shows an example embodiment of the optical sensor 500. The sensor preferably fits within a 0.25 inch diameter cylinder and includes a light emitting element 502 comprising a light emitting diode for transmitting light energy (preferably infrared, but other wavelengths including visible wavelengths may be useable), and a receiving element 504 comprising a transistor. The transmit element 502 and the receiving element 504 are preferably prefocused on the target 506 during manufacturing of the optical frost sensor. The relative angle between the transmit element 502 and the receiving element 504 depends on the distance to the target 506.

In addition to advantages discussed elsewhere, further advantages of the invention may include operating virtually frost free systems while reducing energy costs due to significantly shortened defrosting cycles, reduced product loss due to significantly reduced ambient air change, reduced compressor wear because compressors are never turned off except if a system reaches temperature or capacity.

Some embodiments of the optical frost sensor of the invention are designed to be easily retrofitable into existing functional units to capitalize on reduced energy costs and product loss. While the frost detectors described of the invention may operate at any temperature, the invention is particularly useful at low ambient temperatures; i.e., temperatures below about 55° F. and even at temperatures at or below freezing (below 32° F.). Minor frosting or icing can be necessary to insure optimum system performance. It is at the lower ambient air temperatures that frosting or icing is particularly problematic and is where the invention described herein is of the greatest utility.

A device of this invention may also comprise one or more frost sensors at various points on the exterior surface of the evaporator as an added icing deterrent during extreme temperature or prolonged continuous operation conditions.

When frost is detected at pre-set levels, the optical interface electronic transmits a signal to the controller which initiates a defrost cycle. As previously stated, any desired means for defrosting may be used.

The mounting position, thickness, shape, contours and angles of the optical frost sensor are preferably selected for operational functionality and reliability. The optical frost sensor is preferably mounted to assure optimum thermal conductivity and optical targeting, and in some embodiments, the means for mounting the optical frost sensor is not only to attach to the evaporator, but also to provide a thermal path to the target and the optional temperature sensor. Those skilled in the art will position the bracket on the portion of the evaporator likely to frost first.

Methods of the invention include mounting an optical frost detector built in accord with the invention on an evaporator. Monitoring frost formation, and signaling a controller to activate a defrost cycle when the frost has grown to equal or exceed a predetermined level. The signaling the controller to halt the defrost cycle. As seen in the table below, in alternate embodiments, the signal to halt can be a signal from the optical sensor, a temperature sensor, and a timer.

| Signal source causing activation of defrost cycle | Signal source causing de-activation of defrost cycle |
| --- | --- |
| Optical Frost detection | Optical Frost detection |
| Optical Frost detection | Temperature |
| Optical Frost detection | Time |

It will be appreciated that the present invention provides a device and method for controlling frosting or providing "on demand" defrosting of the surface of an evaporator during operation of a refrigeration cycle. Although certain embodiments and examples have been used to describe the present invention, it will be apparent to those skilled in the art based on the disclosures herein that changes in the embodiments and examples shown may be made without departing from the scope of this invention. Other embodiments are within the following claims.

What is claimed is:

1. An optical frost detector comprising:
   a body including a target and an optical sensor assembly comprising apparatus for emitting electromagnetic radiation at a selected wavelength at said target, and a apparatus for receiving electromagnetic radiation reflected from said target, and
   an electronic optical interface device in communication with said optical sensor assembly capable of detecting changes between said emitted electromagnetic radiation and said received electromagnetic radiation caused by the presence of frost on said target,
   wherein said optical frost detector is coupled to an evaporator coil and is positioned in a flow of air which passes through said evaporator coil.

2. The frost detector of claim 1 wherein said body comprises a material selected to enhance thermal conduction.

3. The frost detector of claim 1 wherein said target includes a coating material selected to enhance the shedding of condensed water droplets.

4. The frost detector of claim 1 wherein said target comprises a shape selected to enhance the shedding of condensed water droplets.

5. The frost detector of claim 1 wherein said body includes a coating material selected to enhance the shedding of condensed water droplets.

6. The frost detector of claim 1 wherein said body comprises a shape selected to enhance the shedding of condensed water droplets.

7. The frost detector of claim 1 wherein said electromagnetic radiation wavelength is an infrared light wavelength.

8. The frost detector of claim 1 configured to be affixed to an evaporator coil of a refrigeration assembly.

9. The frost detector of claim 8 configured to be detachably coupled to an evaporator coil of a refrigeration assembly.

10. The frost detector of claim 1, configured, and positioned on an evaporator coil, to approximate at said target the frost forming and defrosting conditions experienced by said evaporator coil.

11. The frost detector of claim 1 wherein said optical interface electronics is in communication with a controller, and wherein said optical interface electronics signals said controller to initiate a defrost cycle upon detection of a predetermined level of frost formation on said target.

12. The frost detector of claim 11 wherein said optical interface electronics halts said deicing cycle upon detection of a level of frost on said target below a predetermined level.

13. The frost detector of claim 1 further comprising a temperature sensor mounted with said body.

14. The frost detector of claim 13 wherein said temperature sensor emits a signal to halt said defrost cycle upon detection of a predetermined temperature.

15. A frost detector comprising:
    a body including a target and an optical sensor assembly comprising apparatus for emitting electromagnetic radiation at a selected wavelength at said target,
    an apparatus for receiving and detecting changes in electromagnetic radiation reflected from said target caused by the presence of frost on said target, and
    a controller in communication with said apparatus for receiving and detecting changes in electromagnetic radiation reflected from said target, said controller capable of activating a defrost cycle upon receipt of said signal,
    wherein said optical frost detector is coupled to an evaporator coil and is positioned in a flow of air which has passed through said evaporator coil.

16. The frost detector of claim 15 further comprising a temperature sensor mounted with said body.

17. The frost detector of claim 15 wherein said controller halts a defrost cycle upon receipt of a completion signal.

18. The frost detector of claim 17 wherein said completion signal received by said controller originates from a device selected from the group consisting of: said optical sensor assembly, a temperature sensor, and a timer.

19. The frost detector of claim 17 installed in a refrigeration system.

20. The frost detector of claim 15 further comprising at least one temperature sensor positioned on an evaporator.

* * * * *